US010090998B2

(12) United States Patent
Roth et al.

(10) Patent No.: US 10,090,998 B2
(45) Date of Patent: *Oct. 2, 2018

(54) MULTIPLE AUTHORITY DATA SECURITY AND ACCESS

(71) Applicant: Amazon Technologies, Inc., Seattle, WA (US)

(72) Inventors: Gregory Branchek Roth, Seattle, WA (US); Matthew James Wren, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/179,827

(22) Filed: Jun. 10, 2016

(65) Prior Publication Data

US 2016/0285625 A1 Sep. 29, 2016

Related U.S. Application Data

(63) Continuation of application No. 13/922,875, filed on Jun. 20, 2013, now Pat. No. 9,407,440.

(51) Int. Cl.
H04L 29/06 (2006.01)
H04L 9/08 (2006.01)
(Continued)

(52) U.S. Cl.
CPC .......... *H04L 9/083* (2013.01); *G06F 21/6209* (2013.01); *H04L 9/0822* (2013.01);
(Continued)

(58) Field of Classification Search
CPC ..................................... H04L 9/083
See application file for complete search history.

(56) References Cited

U.S. PATENT DOCUMENTS 5,179,591 A 1/1993 Hardy et al.
5,200,999 A 4/1993 Matyas et al.
(Continued)

FOREIGN PATENT DOCUMENTS

CN 102624530 A 8/2012
JP H09294120 A 11/1997
(Continued)

OTHER PUBLICATIONS

Amazon, "Amazon Prime Video—security considerations," Amazon. com General Help Forum, latest reply Jun. 17, 2013, 3 pages, http://www.amazon.com/gp/help/customer/forums?ie=UTF8&cdForum=Fx2NFGOONPZEXIP&cdPage=1&cdSort=newest&cdThread=Tx18VZVGGU0Y32.
(Continued)

*Primary Examiner* — Shawnchoy Rahman
(74) *Attorney, Agent, or Firm* — Davis Wright Tremaine LLP

(57) ABSTRACT

A request to perform one or more operations using a second key that is inaccessible to a customer of a computing resource service provider is received from the customer, with the request including information that enables the computing resource service provider to select the second key from other keys managed on behalf of customers of the computing resource service provider. A first key, and in addition to the first key, an encrypted first key, is provided to the customer. Data encrypted under the first key is received from the customer. The encrypted first key and the data encrypted under the first key is caused to be stored in persistent storage, such that accessing the data, in plaintext form, from the persistent storage requires use of both a third key and the second key that is inaccessible to the customer.

20 Claims, 11 Drawing Sheets

(51) Int. Cl.
  *H04L 9/14* (2006.01)
  *G06F 21/62* (2013.01)
(52) U.S. Cl.
  CPC .......... *H04L 9/0825* (2013.01); *H04L 9/0894* (2013.01); *H04L 9/14* (2013.01)

(56) References Cited

U.S. PATENT DOCUMENTS

| | | | |
|---|---|---|---|
| 5,497,421 A | 3/1996 | Kaufman et al. | |
| 6,084,969 A | 7/2000 | Wright et al. | |
| 6,097,817 A | 8/2000 | Bilgic et al. | |
| 6,185,316 B1 | 2/2001 | Buffam | |
| 6,236,996 B1* | 5/2001 | Bapat | G06F 1/00 |
| 6,453,416 B1 | 9/2002 | Epstein | |
| 6,826,686 B1 | 11/2004 | Peyravian et al. | |
| 6,851,054 B2 | 2/2005 | Wheeler et al. | |
| 6,957,393 B2 | 10/2005 | Fano et al. | |
| 6,959,394 B1 | 10/2005 | Brickell et al. | |
| 6,985,583 B1 | 1/2006 | Brainard et al. | |
| 7,010,689 B1 | 3/2006 | Matyas et al. | |
| 7,073,195 B2 | 7/2006 | Brickell et al. | |
| 7,139,917 B2 | 11/2006 | Jablon | |
| 7,228,417 B2 | 6/2007 | Roskind | |
| 7,320,076 B2 | 1/2008 | Caronni | |
| 7,512,965 B1 | 3/2009 | Amdur et al. | |
| 7,685,430 B1 | 3/2010 | Masurkar | |
| 7,721,322 B2 | 5/2010 | Sastry et al. | |
| 7,757,271 B2 | 7/2010 | Amdur et al. | |
| 7,765,584 B2 | 7/2010 | Roskind | |
| 7,836,306 B2 | 11/2010 | Pyle et al. | |
| 7,890,767 B2 | 2/2011 | Smith et al. | |
| 7,913,084 B2 | 3/2011 | Medvinsky et al. | |
| 7,917,764 B2 | 3/2011 | Futa | |
| 7,921,288 B1* | 4/2011 | Hildebrand | H04L 63/04 713/165 |
| 7,992,188 B2* | 8/2011 | Ohta | G06F 21/6209 705/67 |
| 8,006,289 B2 | 8/2011 | Hinton et al. | |
| 8,024,562 B2 | 9/2011 | Gentry et al. | |
| 8,041,954 B2 | 10/2011 | Plesman | |
| 8,059,820 B2 | 11/2011 | Malaviarachchi et al. | |
| 8,151,116 B2 | 4/2012 | van de Horst et al. | |
| 8,275,356 B2 | 9/2012 | Hickie | |
| 8,332,922 B2 | 12/2012 | Dickinson et al. | |
| 8,370,638 B2 | 2/2013 | Duane et al. | |
| 8,386,800 B2 | 2/2013 | Kocher et al. | |
| 8,387,117 B2 | 2/2013 | Eom et al. | |
| 8,418,222 B2 | 4/2013 | Gbadegesin et al. | |
| 8,423,759 B2 | 4/2013 | Moreau | |
| 8,453,198 B2 | 5/2013 | Band et al. | |
| 8,464,058 B1 | 6/2013 | Chen et al. | |
| 8,464,354 B2 | 6/2013 | Teow et al. | |
| 8,533,772 B2 | 9/2013 | Garg et al. | |
| 8,543,916 B2 | 9/2013 | Anderson et al. | |
| 8,561,152 B2 | 10/2013 | Novak et al. | |
| 8,621,561 B2 | 12/2013 | Cross et al. | |
| 8,688,813 B2 | 4/2014 | Maes | |
| 8,695,075 B2 | 4/2014 | Anderson et al. | |
| 8,739,308 B1 | 5/2014 | Roth | |
| 8,745,205 B2 | 6/2014 | Anderson et al. | |
| 8,776,190 B1 | 7/2014 | Cavage et al. | |
| 8,776,204 B2 | 7/2014 | Faynberg et al. | |
| 8,868,923 B1 | 10/2014 | Hamlet et al. | |
| 8,892,865 B1 | 11/2014 | Roth | |
| 9,300,639 B1* | 3/2016 | Roth | H04L 63/0428 |
| 2001/0008013 A1 | 7/2001 | Johnson et al. | |
| 2001/0018739 A1 | 8/2001 | Anderson et al. | |
| 2002/0016840 A1 | 2/2002 | Herzog et al. | |
| 2002/0067832 A1 | 6/2002 | Jablon | |
| 2002/0112181 A1 | 8/2002 | Smith | |
| 2002/0161723 A1 | 10/2002 | Asokan et al. | |
| 2002/0161998 A1 | 10/2002 | Cromer et al. | |
| 2002/0162019 A1 | 10/2002 | Berry et al. | |
| 2002/0194483 A1 | 12/2002 | Wenocur et al. | |
| 2002/0198848 A1 | 12/2002 | Michener | |
| 2003/0016826 A1 | 1/2003 | Asano et al. | |
| 2003/0041110 A1 | 2/2003 | Wenocur et al. | |
| 2003/0135740 A1 | 7/2003 | Talmor et al. | |
| 2003/0145197 A1 | 7/2003 | Lee et al. | |
| 2003/0149781 A1 | 8/2003 | Yared et al. | |
| 2003/0188117 A1 | 10/2003 | Yoshino et al. | |
| 2004/0088260 A1 | 5/2004 | Foster et al. | |
| 2004/0103096 A1 | 5/2004 | Larsen | |
| 2004/0128505 A1 | 7/2004 | Larsen | |
| 2004/0128510 A1 | 7/2004 | Larsen | |
| 2004/0131185 A1 | 7/2004 | Kakumer | |
| 2004/0143733 A1 | 7/2004 | Ophir et al. | |
| 2004/0158734 A1 | 8/2004 | Larsen | |
| 2004/0172535 A1 | 9/2004 | Jakobsson et al. | |
| 2005/0036611 A1 | 2/2005 | Seaton et al. | |
| 2005/0043999 A1 | 2/2005 | Ji et al. | |
| 2005/0060580 A1 | 3/2005 | Chebolu et al. | |
| 2005/0080914 A1 | 4/2005 | Lerner et al. | |
| 2005/0132192 A1 | 6/2005 | Jeffries et al. | |
| 2005/0132215 A1 | 6/2005 | Wang et al. | |
| 2005/0166263 A1 | 7/2005 | Nanopoulos et al. | |
| 2005/0235148 A1 | 10/2005 | Scheidt et al. | |
| 2005/0273862 A1 | 12/2005 | Benaloh et al. | |
| 2005/0278547 A1 | 12/2005 | Hyndman et al. | |
| 2006/0070116 A1 | 3/2006 | Park | |
| 2006/0075462 A1 | 4/2006 | Golan et al. | |
| 2006/0094406 A1 | 5/2006 | Cortegiano | |
| 2006/0094410 A1 | 5/2006 | Cortegiano | |
| 2006/0100928 A1 | 5/2006 | Waleczak, Jr. et al. | |
| 2006/0130100 A1 | 6/2006 | Pentland | |
| 2006/0149677 A1 | 7/2006 | Shahine et al. | |
| 2006/0174125 A1 | 8/2006 | Brookner | |
| 2006/0190331 A1 | 8/2006 | Tollinger et al. | |
| 2006/0206440 A1 | 9/2006 | Anderson et al. | |
| 2006/0206925 A1 | 9/2006 | Dillaway et al. | |
| 2006/0218625 A1 | 9/2006 | Pearson et al. | |
| 2006/0230284 A1 | 10/2006 | Fiske | |
| 2006/0256961 A1 | 11/2006 | Brainard et al. | |
| 2006/0271honor A1 | 11/2006 | Holtmanns et al. | |
| 2006/0282878 A1 | 12/2006 | Stanley et al. | |
| 2007/0005955 A1 | 1/2007 | Pyle et al. | |
| 2007/0033396 A1 | 2/2007 | Zhang et al. | |
| 2007/0037552 A1 | 2/2007 | Lee et al. | |
| 2007/0061571 A1 | 3/2007 | Hammes et al. | |
| 2007/0061885 A1 | 3/2007 | Hammes et al. | |
| 2007/0136361 A1 | 6/2007 | Lee et al. | |
| 2007/0157309 A1 | 7/2007 | Bin et al. | |
| 2007/0174614 A1 | 7/2007 | Duane et al. | |
| 2007/0186102 A1 | 8/2007 | Ng | |
| 2007/0234410 A1 | 10/2007 | Geller | |
| 2007/0250706 A1 | 10/2007 | Oba | |
| 2007/0277231 A1 | 11/2007 | Medvinsky et al. | |
| 2008/0010665 A1 | 1/2008 | Hinton et al. | |
| 2008/0040773 A1 | 2/2008 | AlBadarin et al. | |
| 2008/0066150 A1 | 3/2008 | Lim | |
| 2008/0080718 A1 | 4/2008 | Meijer et al. | |
| 2008/0083036 A1* | 4/2008 | Ozzie | H04L 63/0428 726/27 |
| 2008/0163337 A1 | 7/2008 | Tuliani et al. | |
| 2008/0168530 A1 | 7/2008 | Kuehr-McLaren et al. | |
| 2008/0182592 A1 | 7/2008 | Cha et al. | |
| 2008/0222694 A1 | 9/2008 | Nakae | |
| 2008/0301444 A1 | 12/2008 | Kim et al. | |
| 2008/0301630 A1 | 12/2008 | Arnold et al. | |
| 2008/0313719 A1 | 12/2008 | Kaliski, Jr. et al. | |
| 2009/0013402 A1 | 1/2009 | Plesman | |
| 2009/0019134 A1 | 1/2009 | Bellifemine et al. | |
| 2009/0049518 A1 | 2/2009 | Roman et al. | |
| 2009/0172793 A1 | 7/2009 | Newstadt et al. | |
| 2009/0210712 A1 | 8/2009 | Fort | |
| 2009/0217385 A1 | 8/2009 | Teow et al. | |
| 2009/0254572 A1 | 10/2009 | Redlich et al. | |
| 2009/0320093 A1 | 12/2009 | Glazier et al. | |
| 2010/0017603 A1 | 1/2010 | Jones | |
| 2010/0083001 A1 | 1/2010 | Shah et al. | |
| 2010/0037304 A1 | 2/2010 | Canning et al. | |
| 2010/0058060 A1 | 3/2010 | Schneider | |
| 2010/0058072 A1 | 3/2010 | Teow et al. | |
| 2010/0071056 A1 | 3/2010 | Cheng | |

(56) References Cited

U.S. PATENT DOCUMENTS

| | | |
|---|---|---|
| 2010/0111296 A1 | 5/2010 | Brown et al. |
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0205649 A1 | 8/2010 | Becker et al. |
| 2010/0239095 A1 | 9/2010 | Carter et al. |
| 2010/0251347 A1 | 9/2010 | Roskind |
| 2010/0269156 A1 | 10/2010 | Hohlfeld et al. |
| 2010/0290476 A1 | 11/2010 | Brindle et al. |
| 2010/0332845 A1 | 12/2010 | Asaka |
| 2011/0004753 A1 | 1/2011 | Gomi et al. |
| 2011/0010538 A1 | 1/2011 | Falk et al. |
| 2011/0035593 A1 | 2/2011 | Pyle et al. |
| 2011/0055562 A1 | 3/2011 | Adelman et al. |
| 2011/0055585 A1 | 3/2011 | Lee |
| 2011/0078107 A1 | 3/2011 | Almeida et al. |
| 2011/0083015 A1 | 4/2011 | Meier |
| 2011/0099362 A1 | 4/2011 | Naga et al. |
| 2011/0131415 A1 | 6/2011 | Schneider |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0231940 A1 | 9/2011 | Perumal et al. |
| 2011/0239283 A1 | 9/2011 | Chern |
| 2011/0252229 A1 | 10/2011 | Belenkiy et al. |
| 2011/0265172 A1 | 10/2011 | Sharma et al. |
| 2011/0296497 A1 | 12/2011 | Becker |
| 2011/0311055 A1* | 12/2011 | Parann-Nissany .... G06F 21/602 380/278 |
| 2011/0320606 A1 | 12/2011 | Madduri et al. |
| 2012/0017095 A1 | 1/2012 | Blenkhorn et al. |
| 2012/0020474 A1 | 1/2012 | Kudoh et al. |
| 2012/0023334 A1 | 1/2012 | Brickell et al. |
| 2012/0036551 A1 | 2/2012 | Le Saint et al. |
| 2012/0054625 A1 | 3/2012 | Pugh et al. |
| 2012/0060035 A1 | 3/2012 | Kalmady et al. |
| 2012/0106735 A1 | 5/2012 | Fukuda |
| 2012/0110636 A1 | 5/2012 | Van Biljon et al. |
| 2012/0144034 A1 | 6/2012 | McCarty |
| 2012/0159577 A1 | 6/2012 | Belinkiy et al. |
| 2012/0216041 A1 | 8/2012 | Naono et al. |
| 2012/0233216 A1 | 9/2012 | Lim |
| 2012/0243687 A1 | 9/2012 | Li et al. |
| 2012/0245978 A1 | 9/2012 | Jain et al. |
| 2012/0265690 A1 | 10/2012 | Bishop et al. |
| 2012/0317414 A1 | 12/2012 | Glover |
| 2013/0007464 A1 | 1/2013 | Madden |
| 2013/0031255 A1 | 1/2013 | Maloy et al. |
| 2013/0086662 A1 | 4/2013 | Roth |
| 2013/0086663 A1 | 4/2013 | Roth et al. |
| 2013/0111217 A1 | 5/2013 | Kopasz et al. |
| 2013/0132232 A1 | 5/2013 | Pestoni et al. |
| 2013/0145447 A1 | 6/2013 | Maron |
| 2013/0166918 A1 | 6/2013 | Shahbazi et al. |
| 2013/0191884 A1 | 7/2013 | Leicher et al. |
| 2013/0198519 A1 | 8/2013 | Marien |
| 2013/0254536 A1 | 9/2013 | Glover |
| 2013/0282461 A1 | 10/2013 | Ovick et al. |
| 2013/0318630 A1 | 11/2013 | Lam |
| 2014/0013409 A1 | 1/2014 | Halageri |
| 2014/0019753 A1* | 1/2014 | Lowry .................. H04L 63/062 713/155 |
| 2014/0079221 A1* | 3/2014 | McCallum ............ H04L 9/0822 380/277 |
| 2014/0082715 A1 | 3/2014 | Grajek et al. |
| 2014/0122866 A1 | 5/2014 | Haeger et al. |
| 2014/0181925 A1 | 6/2014 | Smith |
| 2014/0208408 A1 | 7/2014 | Bilgen et al. |
| 2014/0281477 A1 | 9/2014 | Nayshtut et al. |
| 2014/0281487 A1 | 9/2014 | Klausen et al. |
| 2015/0082039 A1 | 3/2015 | Stalzer et al. |
| 2015/0089614 A1 | 3/2015 | Mathew et al. |

FOREIGN PATENT DOCUMENTS

| | | |
|---|---|---|
| JP | 2001236259 A | 8/2001 |
| JP | 2002082611 A | 3/2002 |
| JP | 2004364188 A | 12/2004 |
| JP | 2006522507 A | 9/2006 |
| JP | 2008219178 A | 9/2008 |
| JP | 2009232012 A | 10/2009 |
| JP | 2014127721 A | 7/2014 |
| WO | WO2006077822 | 7/2006 |
| WO | WO2008024705 | 2/2008 |
| WO | 2013057757 A1 | 4/2013 |

OTHER PUBLICATIONS

Berners-Lee et al., "Uniform Resource Identifier (URI): Generic Syntax," Network Working Group Request for Comments: 3986, The Internet Society 2005, retrieved on Nov. 30, 2011, from http://www.ietf.org/rfc/rfc3986.txt.

Ghorbei-Talbi et al., "Managing Delegation in Access Control Models," International Conference on Advanced Computing and Communications, pp. 744-751, Dec. 18-21, 2007.

International Search Report and Written Opinion dated Dec. 30, 2014, in International Patent Application No. PCT/US2014/057043, filed Sep. 23, 2014.

International Search Report and Written Opinion dated Dec. 30, 2014, in International Patent Application No. PCT/US2014/057051, filed Sep. 23, 2014.

International Search Report and Written Opinion dated Oct. 22, 2014, International Patent Application No. PCT/US2014/042569, filed Jun. 16, 2014.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 Installation Guide [online]," May 2012, retrieved on Jun. 27, 2012, from http://web.mit.edu/kerberos/krb5-1.10/krb5-1.10.2/doc/krb5-install.htm, 65 pages.

Massachusetts Institute of Technology, "Kerberos V5 System Administrator's Guide [online]," May 2012, retrieved on Jun. 27, 2012, from http://web.mit.edu/kerberos/krb5-1.10/krb5-1.10.2/doc/krb5-admin.html, 57 pages.

Massachusetts Institute of Technology, "Kerberos V5 UNIX User's Guide," May 2012, retrieved on Jun. 28, 2012, from http://web.mit.edu/kerberos/krb5-1.10/krb5-1.10.2/doc/krb5-user.html, 38 pages.

Patent Cooperation Treaty, "Notification of Transmittal of the International Search Report and the Written Opinion of the International Searching Authority, or the Declaration," issued to International Application No. PCT/US2012/058083 on Dec. 27, 2012.

Roth et al., "Hierarchical Data Access Techniques," U.S. Appl. No. 13/431,882, filed Mar. 27, 2012.

Simpson, "PPP Challenge Handshake Authentication Protocol (CHAP)," Network Working Group, Aug. 1996, retrieved from internet Jun. 27, 2012, http://etherpad.tools.ietf.org/html/rfc1994, 13 pages.

TCG Published, "TPM Main Part 1 Design Principles," Specification Version 1.2, Revision 116, Mar. 1, 2011, 184 pages.

TCG Published, "TPM Main Part 2 TPM Structures," Specification Version 1.2, Level 2 Revision 116, Mar. 1, 2011, 202 pages.

TCG Published, "TPM Main Part 3 Commands," Specification Version 1.2, Level 2 Revision 116, Mar. 1, 2011, 339 pages.

U.S. Appl. No. 13/431,760, filed Mar. 27, 2012.

U.S. Appl. No. 13/431,898, filed Mar. 27, 2012.

Wang et al., "Extending the Security Assertion Markup Language to Support Delegation for Web Services and Grid Services," IEEE International Conference on Web Services 1:67-74, Jul. 11-15, 2005.

(56) References Cited

OTHER PUBLICATIONS

Wikipedia, "Physical unclonable function," retrieved Aug. 22, 2013, from http://en.wikipedia.org/wiki/Physical_unclonable_function, 8 pages.
Chinese Notice on Grant of Patent Right for Invention dated Feb. 24, 2018, Patent Application No. 201480035028.7, filed Jun. 16, 2014, 2 pages.
Japanese Notice of Rejection dated Feb. 6, 2018, Patent Application No. 2017-007841, filed Jun. 16, 2014, 4 pages.
Japanese Notice of Allowance dated Jul. 3, 2018, Patent Application No. 2017-007841, filed Jun. 16, 2014, 6 pages.

* cited by examiner

MULTIPLE AUTHORITY DATA SECURITY AND ACCESS

CROSS-REFERENCE TO RELATED APPLICATIONS

This application is a continuation of U.S. patent application Ser. No. 13/922,875, filed Jun. 20, 2013, entitled "MULTIPLE AUTHORITY DATA SECURITY AND ACCESS," the content of which is incorporated by reference herein in its entirety.

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

In many instances, various entities find it advantageous to take advantage of computing resource services provided by others. This often involves the transfer of data to and the storage of data in computing resources controlled by third parties. Despite great efforts taken by such third parties to operate environments where data security is emphasized, there can exist a lack of trust, whether justified or not, that can discourage use of services operated by third parties. In addition, organizations that utilize the services of third parties may wish to enhance their own data security so that, for instance, rogue employees or others with access to data are limited in the amount of damage that can be caused. When data is moved among various entities during the operations of an organization, ensuring the security of the data is generally cumbersome, complicated and consumes significant amounts of resources.

BRIEF DESCRIPTION OF THE DRAWINGS

Various embodiments in accordance with the present disclosure will be described with reference to the drawings, in which.

DETAILED DESCRIPTION

Figure 1:
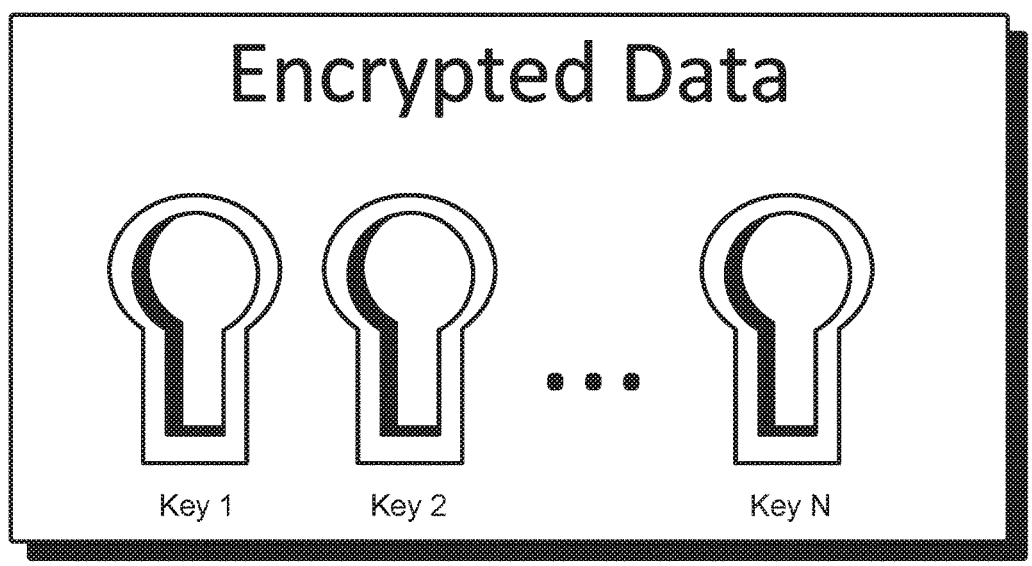
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the encryption of data in a manner that ensures that no single entity is able to access the data without authorization. In some embodiments, processes for encrypting data involve multiple entities and the use of multiple cryptographic keys, also referred to more generally as "keys." The keys that are used may be accessible to one involved entity but not another and all keys may be required for authorized decryption of the data (e.g., decryption of the data without having to obtain one or more keys without authorization). In this manner, if a key is compromised (e.g., if an unauthorized entity gains access to the key), the key cannot be used to decrypt the data without access to one or more additional keys which may be stored by other entities.

In some embodiments, a customer of a computing resource provider has access to a customer key to which the computing resource provider lacks access. Similarly, the computing resource service provider has access to a managed key to which the customer lacks access. The customer may, however, submit requests to the computing resource service provider to cause the computing resource provider to perform cryptographic operations using the managed key. The requests may specify the managed key by an identifier associated with the managed key. The managed key may be managed exclusively for the customer, while ensuring that the customer (and other entities) do not have access to the managed key. In various embodiments, data is encrypted so that both the customer key and the managed key are needed to decrypt the data. In some embodiments, multiple computing resource service providers (or, generally, multiple third party entities) are utilized in an encryption process so that a key exclusively held by each third party is necessary for authorized decryption of the data.

In various embodiments, computer-readable storage media contain executable instructions that, when executed by one or more processors of a customer computer system, cause the computer system to orchestrate the flow of data to cause the data to be encrypted using multiple keys. The executable instructions may be provided by a computing resource provider, such as part of a downloadable client library with various programming modules for utilizing services offered by the computing resource service provider. As another example, the executable instructions may be in the form of JavaScript® or another interpreted and/or scripting language. Multiple customers may utilize the executable instructions to orchestrate the flow of data among the various entities having keys involved in an encryption and/or decryption process, thereby enhancing their data security by ensuring that a compromise at one entity is not enough for unauthorized data access.

As discussed in more detail below, in some embodiments, a system comprises one or more computer systems including one or more processors and computer memory, where the memory includes instructions that, upon execution by the one or more processors, cause the system to perform various operations. The operations may include receiving, from a client (such as a computing device of a customer of a computing resource service provider), a request to perform a cryptographic operation using a first key specified in the request. The system may, pursuant to the instructions, send, in response to the request, a cryptographic key encrypted using at least a key controlled by a service provider operating the one or more computer systems. The system may additionally, pursuant to the instructions, receive data encrypted using the cryptographic key, wherein the data encrypted using the cryptographic key additionally being encrypted using a client key. Upon receipt of the data encrypted using the cryptographic key, the system may, pursuant to the instructions, perform one or more operations in connection with the encrypted data, such as by persistently storing the encrypted data in one or more data storage devices.

FIG. 1 is a diagram illustrating various aspects of the present disclosure. As illustrated in FIG. 1 the various techniques described and suggested herein apply to encrypted data. In particular, the data may be encrypted in accordance with the various techniques described herein such that multiple keys are necessary for decrypting the data. The multiple keys may be held by different entities such that any particular entity is unable to decrypt the data with any keys to which the entity has access. As discussed in more detail below, the multiple keys needed to decrypt the data may be individual keys and/or keys that are derived from the same key.

Figure 2:
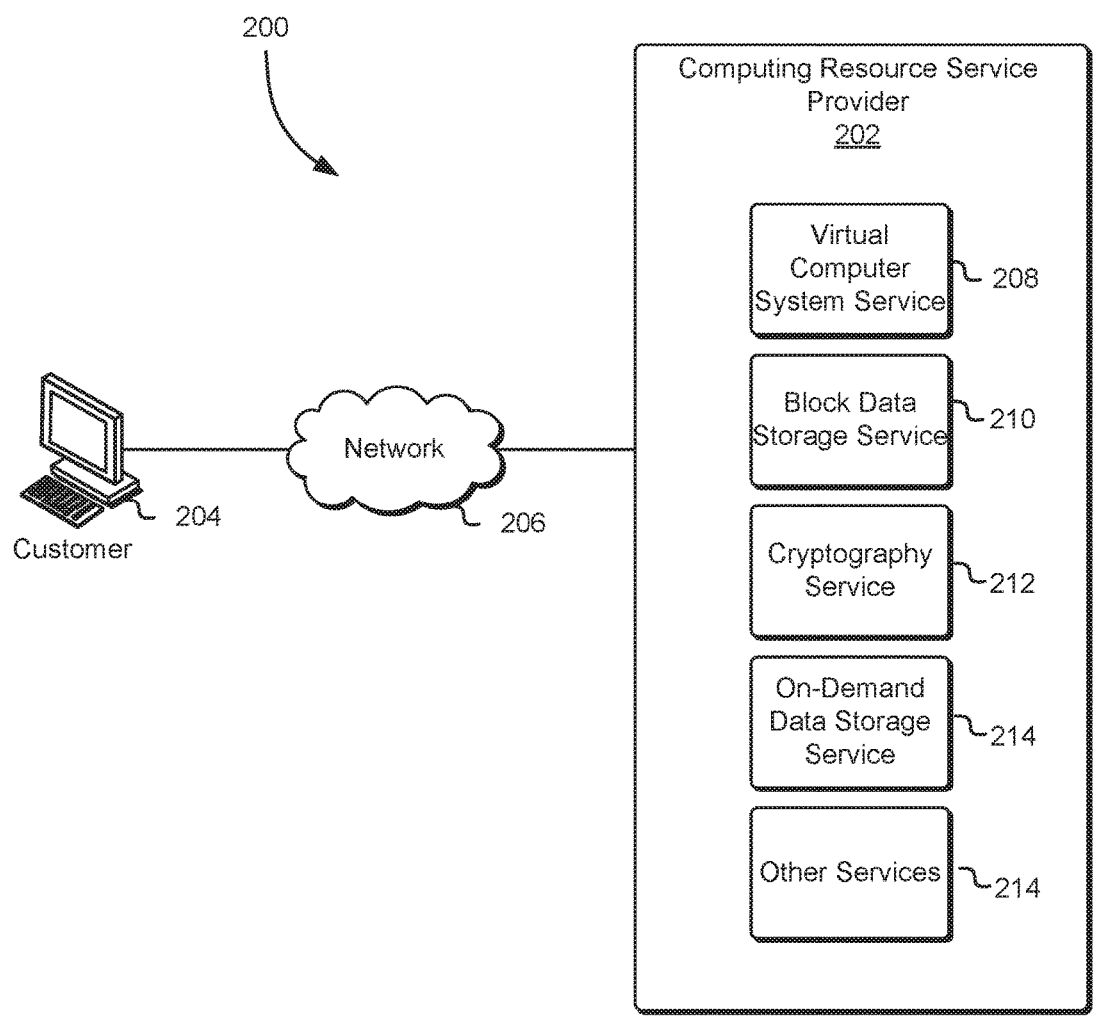
FIG. 2 illustrates an example environment in which various embodiments can be implemented.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to maintain and deliver information to its employees, which may be located in various geographical locations. Additionally, the customer 204 may be an individual that could utilize the various services to deliver content to a working group located remotely. As illustrated in FIG. 2, the customer 204 may communicate with the computing resource service provider 20 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. The services provided by the computing resource service provider, in this example, include a virtual computer system service 208, a block-level data storage service 210, a cryptography service 212 (also referred to as a key management service), an on-demand data storage service 214 and one or more other services 216, although not all embodiments of the present disclosure will include all such services and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service and/or to access one or more block-level data storage devices provided by the block data storage service).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications.

The block-level data storage service 210 may comprise a collection of computing resources that collectively operate to store data for a customer 204 using block-level storage devices (and/or virtualizations thereof). The block-level storage devices of the block-level data storage service 210 may, for instance; be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

As illustrated in FIG. 2, the computing resource service provider 202 may operate a cryptography service, which is described in more detail below in connection with FIG. 3. Generally, the cryptography service may be a collection of computing resources collectively configured to manage and use cryptographic keys for customers of the computing resource service provider. Keys used by the cryptography service 212 may have associated identifiers that the customers can reference when submitting requests to perform cryptographic operations (such as encryption, decryption and message signing) and/or other operations, such as key rotation. The cryptography service may securely maintain the cryptographic keys to avoid access by unauthorized parties.

The computing resource service provider 202 may also include an on-demand data storage service. The on-demand data storage service 214 may be a collection of computing resources configured to synchronously process requests to store and/or access data. The on-demand data storage service 214 may operate using computing resources (e.g., databases)

that enable the on-demand data storage service 214 to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a key value store that associates data objects with identifiers of the data objects which may be used by the customer 204 to retrieve or perform other operations in connection with the data objects stored by the on-demand data storage service 210. The on-demand data storage service 214 may also be accessible to the cryptography service 212. For instance, in some embodiments, the cryptography service utilizes the on-demand data storage service to store keys of the customers in encrypted form, where keys usable to decrypt the customer keys are accessible only to particular devices of the cryptography service 212. Access to the data storage service by a customer, another service, or other entity may be through appropriately configured API calls.

The computing resource service provider 202 may additionally maintain one or more other services 216 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

As discussed above, various embodiments of the present disclosure are directed to providing cryptography services. Cryptography services may be provided by a cryptography service system such as described above. FIG. 3 accordingly shows an illustrative example of a cryptography service 300 in accordance with various embodiments. As illustrated in FIG. 3 and as discussed above, the cryptography service 300 is logically comprised of a frontend system and a backend system. Both the frontend system and the backend system may be implemented by one or more computer systems configured to perform operations described herein. For example, as illustrated in FIG. 3, the frontend system of the cryptography service 300 implements a request API 306 and a policy configuration API 308. The request API, in an embodiment, is an API configured for requesting cryptographic and other operations to be performed by the cryptography service. Thus, requests may be made to the frontend system via the request API in order for such cryptographic operations to be performed by the cryptography service.

The request API may be configured with the following example, high-level, requests available:
CreateKey(KeyID)
Encrypt(KeyID, Data, [AAD])
Decrypt(KeyID, Ciphertext,
Shred(KeyID)
ReKey(Ciphertext, OldKeyID, NewKeyID).

A CreateKey(KeyID) request, in an embodiment, causes the cryptography service to create a key identified by the KeyID identified in the request. Upon receipt of a request, the cryptography service may generate a key and associate the key with the KeyID. It should be known that KeyID's may be, but are not necessarily unique identifiers. For instance, a KeyID may identify a family of keys. For example, in some embodiments, key rotation is performed. Key rotation may involve replacing keys with other keys to prevent collection of enough decrypted data to allow practical cracking of a cipher used. If performed at the direction of an entity different from the cryptography service, use of the CreateKey(KeyID) request may cause the cryptography service to create a new key to replace an old key identified by the KeyID. The old key may remain identified by the KeyID, but may, for instance, be only used for decryption (of data that has already been encrypted using the old key) and not for future encryption. As another example, in some embodiments, users of the cryptography service provide their own key identifiers and there is a possibility that two different customers may provide the same identifier. In such instances, the identifier may not uniquely identify a key or even uniquely identify a family of keys. Various measures may be in place to address this. For example, an identity or other information associated with a user of the cryptography service may be used to identify the proper key or family of keys. In still other embodiments the cryptographic service may assign a KeyID randomly, sequentially, or using any other method.

It should be noted that, when a KeyID does not uniquely identify a key, various systems may be in place to enable proper functionality. For example, in various embodiments, a family of keys identified by a Key-ID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptographic service to detect that the ciphertext was not generated based at least in part on the key, such as by using authenticated encryption. Other variations are also considered as being within the scope of the present disclosure.

An Encrypt(KeyID, Data, [AAD]) request may be used to cause the cryptography service to encrypt the specified data using a key identified by the KeyID. Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt(KeyID, Data, [AAD]) requests may require, by programming logic and/or policy enforced by the cryptography service, both that the AAD contain particular values and that the AAD be authentic (e.g., not modified since original transmission). Similarly, a Decrypt(KeyID, Ciphertext, [AAD] request may be used to cause the cryptography service to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by the cryptography service, both that the AAD contain particular values and that the AAD be authentic (e.g., not modified since original transmission).

The Shred(KeyID), in an embodiment, may be used to cause the cryptography service to electronically shred a key or family of keys identified by the specified KeyID. Electronic shredding may include making the key no longer accessible. For example, use of the Shred(KeyID) request may cause the cryptography system to command one or more hardware devices to perform a SecureErase operation on one or more keys identified by the specified KeyID. Generally, the key(s) identified by the KeyID may be electronically shredded in any suitable manner, such as by overwriting data encoding the key with other data (e.g., a series of zeros or ones or a random string) and/or by removing power to volatile memory in which the key is stored. If the key(s) are stored encrypted under a key, the key used to encrypt the keys may be electronically shredded, thereby causing a loss of access to the key(s). In some embodiments, the shred operation may cause decrypt operations indicating the shredded KeyID to fail at some determined point in the future. Other manners of securely and permanently destroying any possible access to the key(s) may be used.

The ReKey(Ciphertext, OldKeyID, NewKeyID) request, in an embodiment, may be used to cause the cryptography service to encrypt ciphertext under a different key. When the cryptography service receives a ReKey(Ciphertext, OldKeyID, NewKeyID) request, it may use a key identified by the OldKeyID to decrypt the specified ciphertext and then use a key identified by the NewKeyID to encrypt the decrypted ciphertext. If a key identified by the New:KeyED does not yet exist, the cryptography service may generate a key to use and associate the generated key with the specified NewKeyID, such as described in connection with the Create (KeyID) request described above. In some embodiments, the ReKey operation may be operable to cause data to be transferrable between isolated instances of a cryptography service. In some embodiments, a policy might permit a rekey operation to be performed on a ciphertext but might not permit the same requestor to directly decrypt the ciphertext. In some embodiments, ReKey might support rekeying a ciphertext from a key identified by a first Key-ID within a first account to a key identified by a KeyID within a second account.

Similarly, the frontend system may implement a policy configuration API which, in an embodiment, enables users to submit requests for configuring policies for the performance of cryptographic operations and for other policy-related operations. Policies may be associated with keys, groups of keys, accounts, users and other logical entities in various embodiments. Example policies, which may be configured via the policy configuration API, are provided below. In an embodiment, the cryptography service policy configuration API includes the following requests:
SetKeyPolicy(KeyID, Policy)
Suspend(Key-ID, Public Key)
Reinstate(Key-ID, Private Key).

In an embodiment, the SetKeyPolicy(KeyID, Policy) request may be used to cause the cryptography service to store a policy on the key (or family of keys) identified by the KeyID. A policy may be information that is determinative of whether a requested cryptographic operation can be performed in a particular context. The policy may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions that must be satisfied for a cryptographic operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given above. Example policies appear below.

In some embodiments the cryptographic service may support a suspend operation, e.g., using a Suspend(KeyID, Public Key) API call. A suspend operation enables the customer of the cryptographic service to deny the operator of the cryptographic service use of or access to a key. This can be useful to customers concerned about covert lawful orders or other circumstances in which the operator of the cryptographic service might be compelled to perform some operation using a key. It may also be useful to customers that wish to lock particular data and render it inaccessible online. In some embodiments, a suspend operation might include receiving a public key from a customer and encrypting the key specified by a given KeyID with the received public key and shredding the key specified by the KeyID, such that the provider is not able to access the suspended key unless the private key associated with the public key is provided, e.g., using a Reinstate(KeyID, Private Key) API call that both specifies the KeyID and includes the private key. In some other embodiments, a suspend operation might involve encrypting a key associated with a specified KeyID using another key managed by the cryptographic service, including without limitation one created for the purpose of the instant suspend operation. The ciphertext produced by this operation can be provided to the customer and not retained within the cryptographic service. The original key identified by the KeyID can then be shredded. The cryptographic service may be operable to receive the provided ciphertext and re-import the suspended key. In some embodiments the ciphertext may be generated in a manner that will prevent the cryptographic service from returning a decrypted version to the customer.

Figure 3:
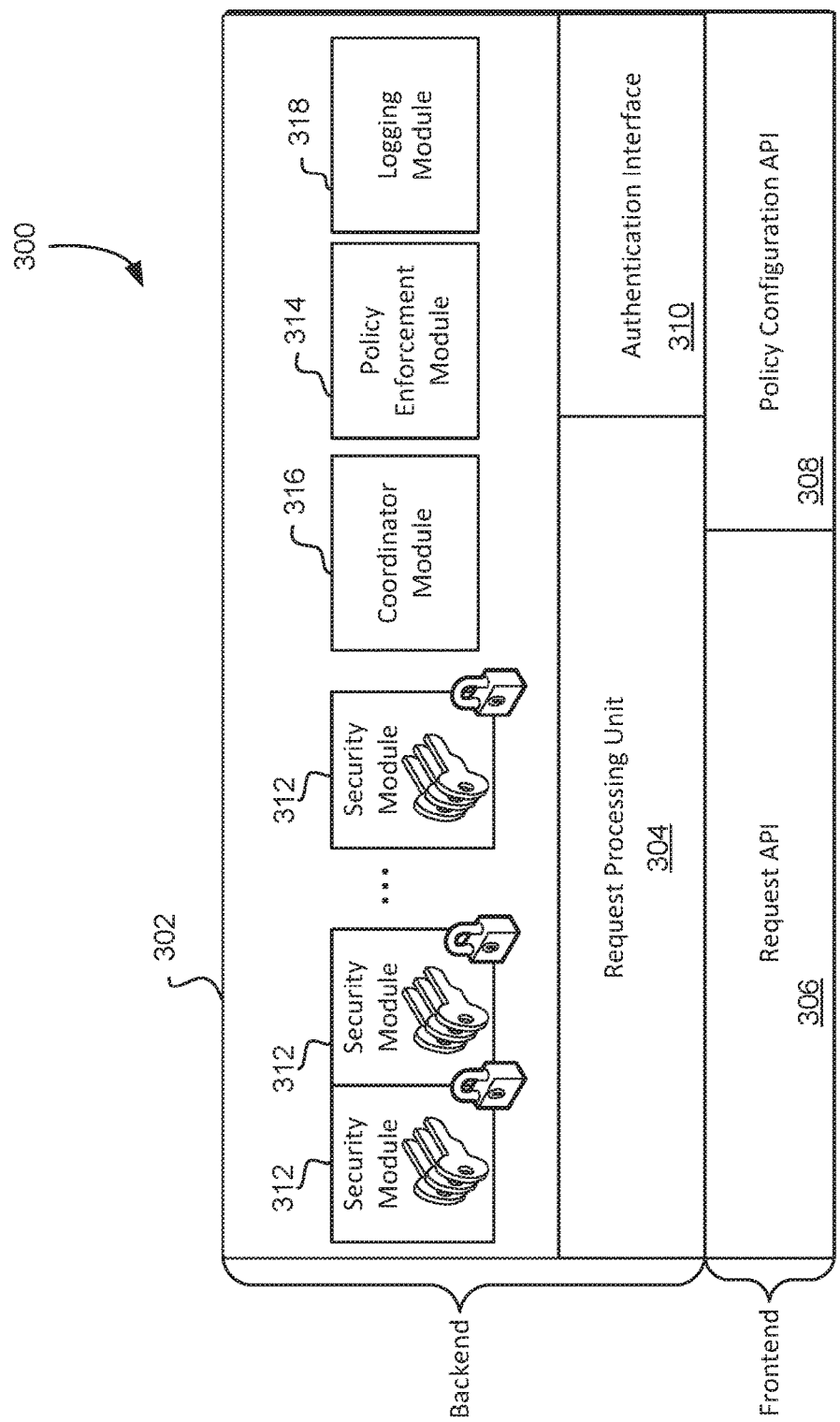
FIG. 3 shows an illustrative example of an environment that may be used to implement a cryptography service in accordance with at least one embodiment.

As illustrated in FIG. 3, the cryptography service 300 includes a backend system 302 that itself comprises various components in some embodiments. For example, the backend system in this example includes a request processing system (also referred to as a request processing unit or request processing component) 304 which may be a subsystem of the cryptography service 300 that is configured to perform operations in accordance with requests received through either the request API 306 or the policy configuration API 308. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface 310 which enables the request processing unit to determine whether requests are authentic. The authentication interface may be configured to interact with an authentication system, which may be an authentication system utilized by multiple services of a computing resource service provider. For example, when a request is received by the request processing unit, the request processing unit may utilize the authentication interface to interact with an authentication service which may, if applicable, provide authentication proof that may be used in order to cause a performance of cryptographic operations. The request processing system 304 may also be configured with an interface that enables interaction with other services of a computing resource service provider. For example, in embodiments where customer keys are stored in encrypted form in a data storage service, the request processing system 304 may submit API calls to the data storage service to obtain customer keys when needed. The cryptography service may also store customer keys in encrypted form in a local data storage system or in encrypted or unencrypted form in one or more security modules 312, discussed below.

The backend system of the cryptography service 300, in this illustrative example, includes a plurality of a security modules 312 (cryptography modules), a policy enforcement module 314, and a coordinator module 316. The coordinator module may be a system configured to coordinate the security modules 312. For example, in some embodiments, the coordinator module is configured to ensure that security modules 312 identified as members of a cryptographic domain (also referred to simply as "domain") operate in accordance with consistent operational parameters for the domain. As one example, each security module may have access to a domain key for the domain. Customer keys may be encrypted under the domain key and stored externally to the security modules (e.g., in the backend system and/or using a data storage service), thereby enabling the security modules 312 to operate without the need to store all customer keys that the security modules may use. Briefly, when a customer requests that a cryptographic operation be performed using a key identified by a KeyID, the encrypted customer key identified by the KeyID may be provided to a security module that can use the domain key to decrypt the customer key and use the decrypted customer key to perform the requested operation using the decrypted customer key.

As another example, the coordinator module 316 may be configured to ensure that the security modules 312 each enforce a common set of rules before accepting (e.g., reconfiguring) to an updated set of operational parameters. For instance, each security module may enforce quorum rules that defines one or more sets of operators that are sufficient for authorizing certain changes to the operational parameters, such as changes to the domain key (e.g., to rotate the domain key), changes to the members of the set of security modules comprising the domain, changes to a set of operators for the domain (e.g., those authorized to participate in causing changes to be made to the domain the like.

In the embodiment described in FIG. 3, one or more of the security modules may be hardware security modules although, in various embodiments, a security module may be any suitable computer device configured according to have capabilities described herein. Each security module, in an embodiment, either stores a plurality of keys associated with KeyIDs and/or stores keys under which externally stored keys associated with KeyIDs are encrypted. Each security module may be configured to securely store the keys so as to not be accessible by other components of the cryptography service 300 and/or other components of other systems. For instance, in some embodiments in which security modules store domain keys as described above, only security modules of a domain may store a corresponding domain key. All other entities may lack access to the domain key.

In various embodiments, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptographic Module Validation Program (CMVP). As noted, a security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit 304. For example, the request processing unit may provide ciphertext and a KeyID to an appropriate security module with instructions to the security module to use a key associated with the KeyID to decrypt the ciphertext and provide in response the plaintext. In embodiments where customer keys are stored externally to security modules, the request processing unit 304 may access an encrypted version of the key identified by the KeyID (e.g. from a local storage system or an external cryptography service) and provide the encrypted version of the key to the security module, which can then decrypt and then use the key.

In an embodiment, the backend system of the cryptography service 300 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module 314 is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 3 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

As illustrated in FIG. 3, the cryptography service 300 may include a logging module 318. The logging module may be a system configured to perform various activities in connection with tracking various operations of the cryptography service. For example, requests submitted to the request API 306 may be logged by the logging module 318 in association with other data, such as, for each request, an identifier of the customer on behalf of whom the request was purportedly submitted, an identity associated with the customer (e.g., employee or contractor) that transmitted the request, the type of the request (e.g., which of several API call types was used), whether the request was approved, whether the request was fulfilled, any reasons the request was not approved (if applicable), an identifier of a key used in fulfilling the request, and the like. The logging module may also be configured to maintain counters for keys identified by KeyIDs. When information is received by the logging module that indicates one or more operations have been performed using a key, the logging module may update the counter for the key accordingly. The counter may be updated for operations of a type that contribute to cryptographic key wear out. For instance, an encryption operation may cause the counter to increase whereas a decryption operation may not. It should be noted that, in some embodiments, counters are not to be maintained by the logging module, but counters are to be updated by accessing logs from the logging module and calculating the number of operations that have been performed.

Figure 4:
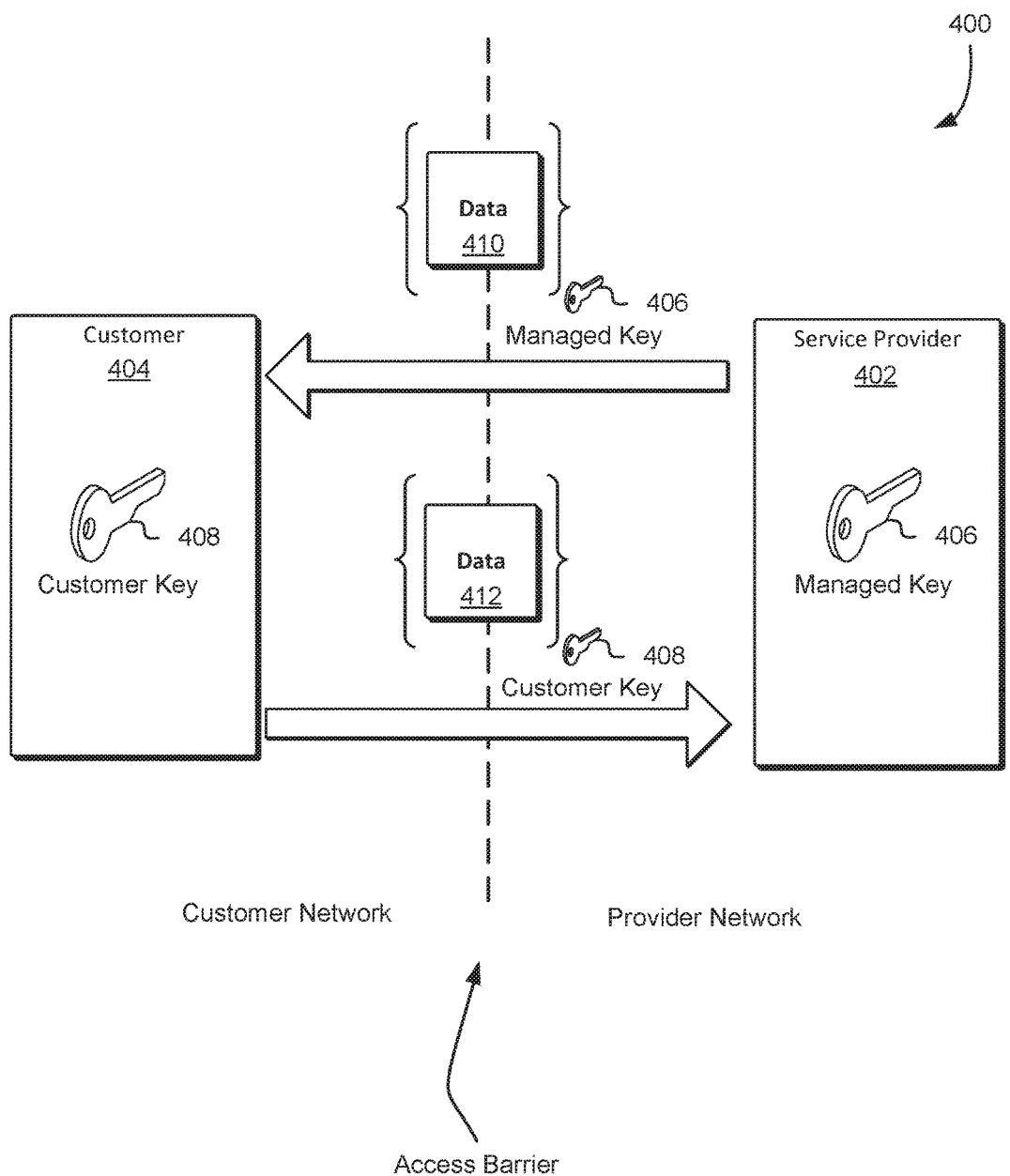
FIG. 4 shows an illustrative example of a diagram illustrating various aspects of the present disclosure.

FIG. 4 shows a diagram illustrating various aspects of the present disclosure. As illustrated in FIG. 4, a service provider 402 provides various services for customers 404 of the service provider. As illustrated in FIG. 4, the service provider 402 has access to a managed key 406 to which the customer 404 does not have access. Similarly, the customer 404 has access to a customer key 408 to which the service provider 402 does not have access. The keys, and generally, all keys described herein, may be data configured to be usable with one or more cryptographic ciphers. Data may be transmitted between the customer 404 and service provider 402 in connection with the customer 404's utilization of the services provided by the service provider 402. Data exchanged between the service provider 402 and the customer 404 may be encrypted using keys to which the sender but not receiver has access. For example, as illustrated in FIG. 4 data 410 is encrypted by the service provider 402 under the managed key 406 and transmitted in encrypted form to the customer 404. Similarly, data 412, which as described in more detail below may be related to the data 410, is encrypted using the customer key 408 and transmitted in encrypted form to the service provider 402. In this manner, the customer 404 is unable to decrypt the data 410 as a result of lacking access to the managed key 406. Similarly, the service provider 402 is unable to decrypt the data 412 that is encrypted under the customer key 408 as a result of the service provider lacking access to the customer key 408.

As illustrated in FIG. 4, the environment 400 includes an access barrier between the customer network and the provider network. The access barrier may be a logical and/or physical barrier between the customer network and the provider network that data in one network is not freely accessible to devices in the other network. For instance, the customer network and provider network may be separated by a public communications network. The customer network and provider network may each employ one or more firewalls, policy management systems, access control mechanisms, and/or other access control mechanisms to restrict access. It should be noted that the access barrier need not restrict all data access between the customer 404 and provider 402, but may freely allow some access while restricting other access. For example, the service provider may utilize a web service interface that is publically accessible. The service provider 402 may, however, configure the provider network so that the managed key 406 is not accessible to the customer 404. Similarly, the customer 404 may configure the customer network so that the customer key 408 is inaccessible to the service provider 402. It should be noted that the customer network and the provider network need not be completely separate networks. For instance, some or all of the customer network can be hosted on computing resources of the provider network. For instance, some or all of the network may be implemented as an overlay network of physical computer systems hosted by the service provider 402. The customer network may comprise one or more virtual computer systems implemented by hardware resources of the service provider 402 as part of a virtual computer system service. Other variations are also considered as being within the scope of the present disclosure.

Figure 5:
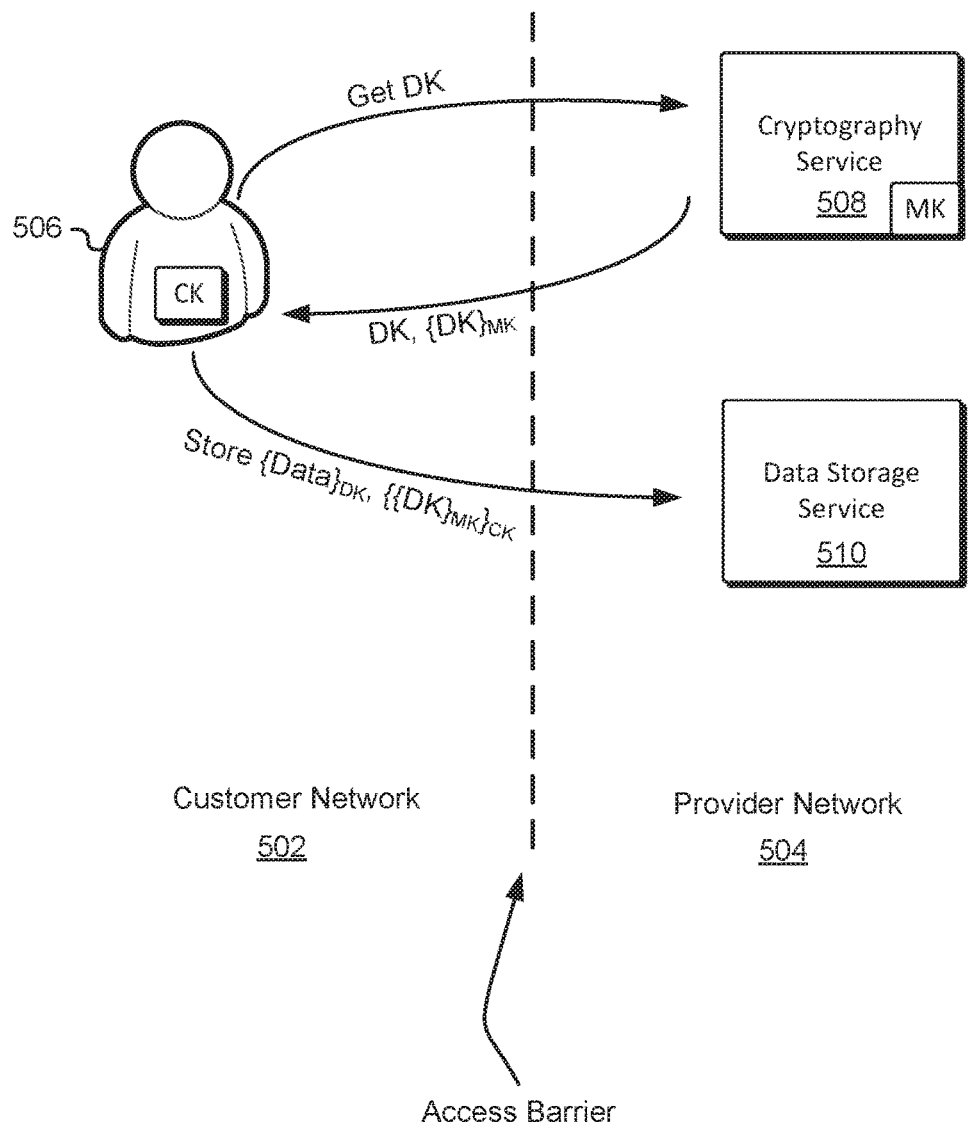
FIG. 5 shows an illustrative example of a manner of storing data securely in accordance with at least one embodiment.

FIG. 5 shows a diagram illustrating an embodiment of the present disclosure. The diagram in FIG. 5 shows an environment which comprises a customer network 502 and a provider network 504 where the customer and provider may be as described above. The customer network may be managed (locally and/or remotely) by a customer 506, which, while illustrated in human form, may be an organization. The provider may be a service provider providing a service to the customer 506 and in some embodiments the provider is a computing resource service provider. As discussed above, the customer network 502 and provider network 504 are separated by an access barrier. As discussed, the access barrier may comprise one or more physical and/or logical barriers between the customer network 502 and provider network 504. As discussed in more detail below, the customer 506 may transmit and receive data to the service provider. The customer 506, and generally customers described herein, may transmit such data in accordance with computer-readable instructions embedded in a computer-readable storage medium that are executed by a computer system of the customer 506.

The computer system of the customer 506 may be a computing device, such as any of the computing devices enumerated below. In some embodiments, the computer system of the customer is a mobile device (e.g., mobile phone and/or tablet computing device). The mobile device may be configured to store keys (e.g., customer keys), to synchronize keys across a plurality of mobile or devices associated with a user (e.g., a user's mobile phone, personal computer, and tablet computing device). Synchronization may be performed through one or more enterprise synchronization products. Synchronization may utilize one or more communication methods such as Bluetooth®, near field communication (NFC), or another local communication method. Further, the various communications to/from the computer system of the client 506 may be orchestrated by a browser or other application executing on the client computer system. The browser and/or other application may orchestrate communications with the cryptography service and the data storage service pursuant to executable instructions provided to customer from a server of the computing resource service provider. For example, the computing resource service provider may provide executable code in the form of active content, such as JavaScript® or another scripting language.

As illustrated in FIG. 5, a customer 506 with access to a customer key, abbreviated as CK, submits a request to a cryptography service 508 to obtain a data key, abbreviated as DK. The cryptography service 508 may authenticate the request, and if authentic, provide a response that includes a data key, and the data key encrypted under a managed key (${DK}_{MK}$), where the managed key may be a key managed for the customer by the cryptography service 508, such as described above. It should be noted that the notation ${A}_B$ indicates that data A is encrypted under key B. In other words, ${A}_B$ indicates data obtained based at least in part on application of a cryptographic cipher with input B. It should be noted that ${A}_B$ is not necessarily, but can be, the direct output of the cipher, but could be indirect output. For example, output of application of a cipher to A using key B may be input into yet another cipher, possibly using another key. The managed key, as illustrated in FIG. 5, is abbreviated as MK.

Upon receipt from the cryptography service 508 of the data key and data key encrypted under the managed key, the customer 506 may use the data key to encrypt data and may use its own customer key to encrypt the data key that has been encrypted under the managed key. In addition, after encrypting the data using the data key the customer 506 may electronically discard the data key, such as by allowing any memory storing the data key to be overwritten. Generally, the data key may be discarded in any suitable manner in which the customer loses immediate access to the data key (i.e., the customer must perform and/or have performed one or more cryptographic operations to access the data key in plaintext form. In this manner, the data key becomes accessible only with access to both the managed key and the customer key, which may require collective action by multiple entities, each of which lacking access to bath keys, such as described below.

The customer then may cause the data encrypted under the data key and the data key encrypted under the managed key and the customer key to be persisted. For instance, as illustrated in FIG. 5 the customer transmits the data encrypted under the data key and the data key encrypted under both the managed key and customer key (e.g., $\{\{PK\}_{MK}\}_{CK}$) to a data storage service 510 operated by the service provider. The data encrypted under the data key, $\{Data\}_{DK}$, and data key encrypted under both the managed key and customer key, $\{\{DK\}_{MK}\}_{CK}$, may be persisted in other ways. For example, the $\{Data\}_{DK}$ and $\{\{DK\}_{MK}\}_{CK}$ may be stored locally by the customer in a device in the customer network 502, or using a data storage service of a different service provider, which is not illustrated. The $\{Data\}_{DK}$ and $\{\{DK\}_{MK}\}_{CK}$ may be stored in association with each other, for instance, by combining and storing as a single data object (e.g., with a delimiter separating $\{Data\}_{DK}$ and $\{\{DK\}_{MK}\}_{CK}$ to enable distinguishing $\{Data\}_{DK}$ from $\{\{DK\}_{MK}\}_{CK}$). Alternatively, $\{Data\}_{DK}$ and $\{\{DK\}_{MK}\}_{CK}$ may each be stored as separate data objects in association with one another, where the association may be maintained by a database and/or by data (e.g., reference information) stored in one or both data objects. In addition, $\{Data\}_{DK}$ and $\{\{DK\}_{MK}\}_{CK}$ need not be stored in the same place. For instance, the customer may locally store $\{\{DK\}_{MK}\}_{CK}$ but use the data storage service 510 or another data storage service to store $\{Data\}_{DK}$. Other variations are also considered as being within the scope of the present disclosure.

Figure 6:
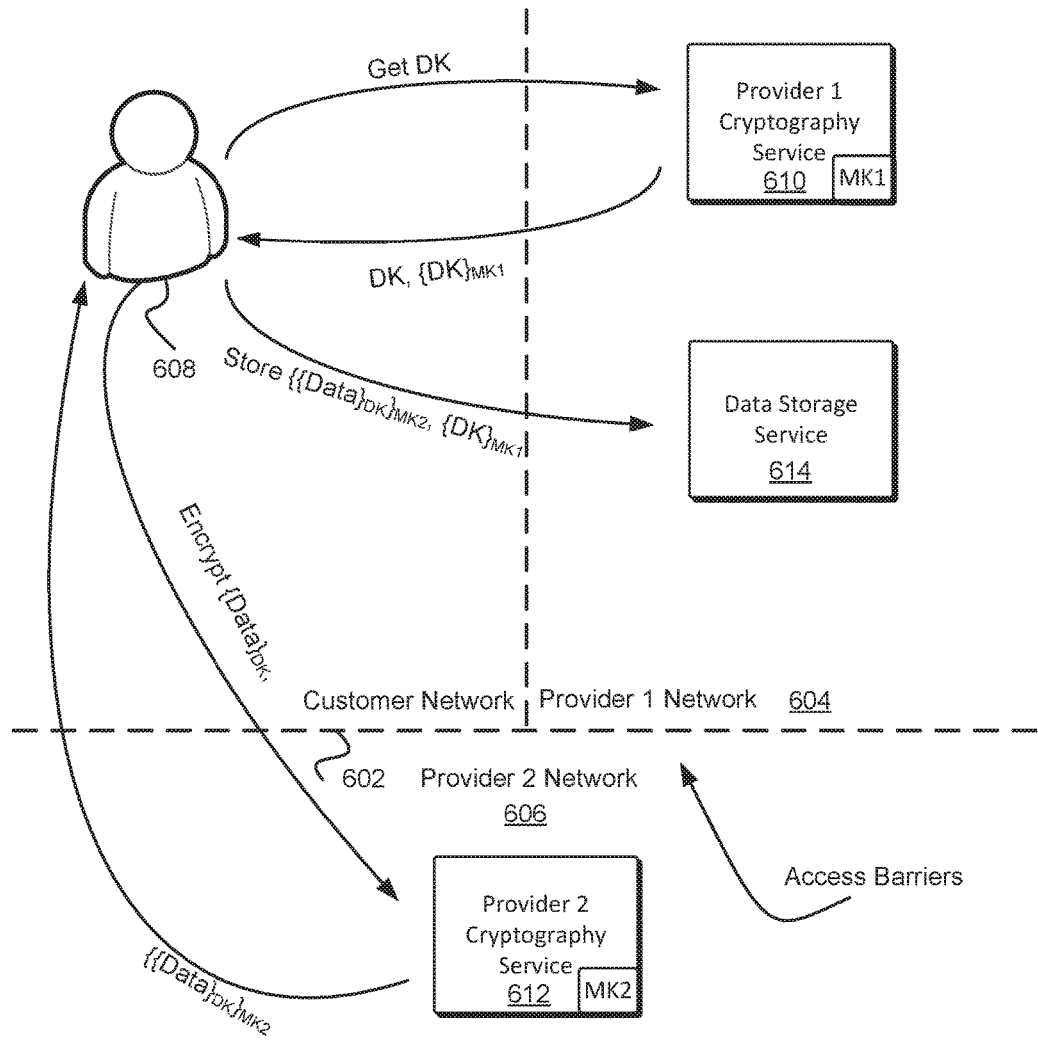
FIG. 6 shows an illustrative example of a manner of storing data securely in accordance with at least one embodiment.

FIG. 6 shows an illustrative diagram demonstrating another embodiment in accordance with the present disclosure. In the diagram illustrated in FIG. 6, an environment includes a customer network 602, first provider network 604 and second provider network 606. The customer network 602 and first provider network 604 may be networks such as the customer network 502 and provider network 504 described above in connection with FIG. 5. The second provider network 606 may be a network such as described above, although operated by a different entity than the service provider of the first provider network 604. Further, the first provider network 604 and second provider network 606 may operate differently, such as by supporting differently formatted API calls and/or by processing requests differently. As illustrated in FIG. 6, the customer network 602, first provider network 604 and second provider network 606 are separated by access barriers, such as described above.

As illustrated in FIG. 6, a customer 608 submits a request to a first provider cryptography service 610 for a data key. The request may be submitted such as described above in connection with FIG. 5, e.g., as an appropriately configured web service API call. Similarly to that which is described above in connection with FIG. 5, the first provider cryptography service 610 may have access to a managed key managed by the first service provider on behalf of the customer. In FIG. 6, the managed key managed by the first service provider is abbreviated as MK1 and also referred to, in connection with FIG. 6, as the "first managed key." In response to the request for a data key, the first provider cryptography service 610 may provide a response to the request that includes a data key and the data key encrypted under the first managed key, i.e., DK and $\{DK\}_{MK1}$.

As described above in connection with FIG. 5, the customer may use the data key to encrypt data using the data key received from the first service provider. The customer 608 may then submit a request to a second provider cryptography service 612 to encrypt the data encrypted under the data key ({Data}) using a second managed key, abbreviated in the figure as MK2. The second provider cryptography service 612 may provide a response to the request to encrypt the data encrypted under the data key, $\{Data\}_{DK}$. In particular, the second provider cryptography service 612 may encrypt $\{Data\}_{DK}$ using the second managed key, MK2, and provide, in response to the request from the customer 608, the data encrypted under the data key encrypted under the second managed key, $\{\{Data\}_{DK}\}_{MK}$. The customer 608 may then submit a request to a data storage service 614 of the first service provider to store the data encrypted under both the data key and the second managed key and the data key encrypted under the first managed key, i.e. a request to store $\{\{Data\}_{DK}\}_{MK2}$ and $\{DK\}_{MK1}$. As with FIG. 5 and other processes illustrated herein, multiple requests may be submitted, such as a first request to store $\{\{Data\}_{DK}\}_{MK2}$ and a second request to store $\{DK\}_{MK1}$.

In this manner, access to the data requires use of both the first managed key, MK1, to access the data key, DK, and access to the second managed key, MK2, to access the data.

As with other embodiments described herein, additional variations are considered as being within the scope of the present disclosure. For example, as an alternative to the embodiment illustrated in FIG. 6 the customer 608 may request that the second provider cryptography service 612 encrypt not the data encrypted under the data key but the data key encrypted under the first managed key. A response may be provided by the second provider cryptography service accordingly, i.e., a response may include $\{\{DK\}_{MK1}\}_{MK2}$. Other variations such as where the data encrypted for the customer is persisted, such as in a local data store of the customer 608 in a data storage service of the second provider cryptography service and/or in other locations.

Figure 7:
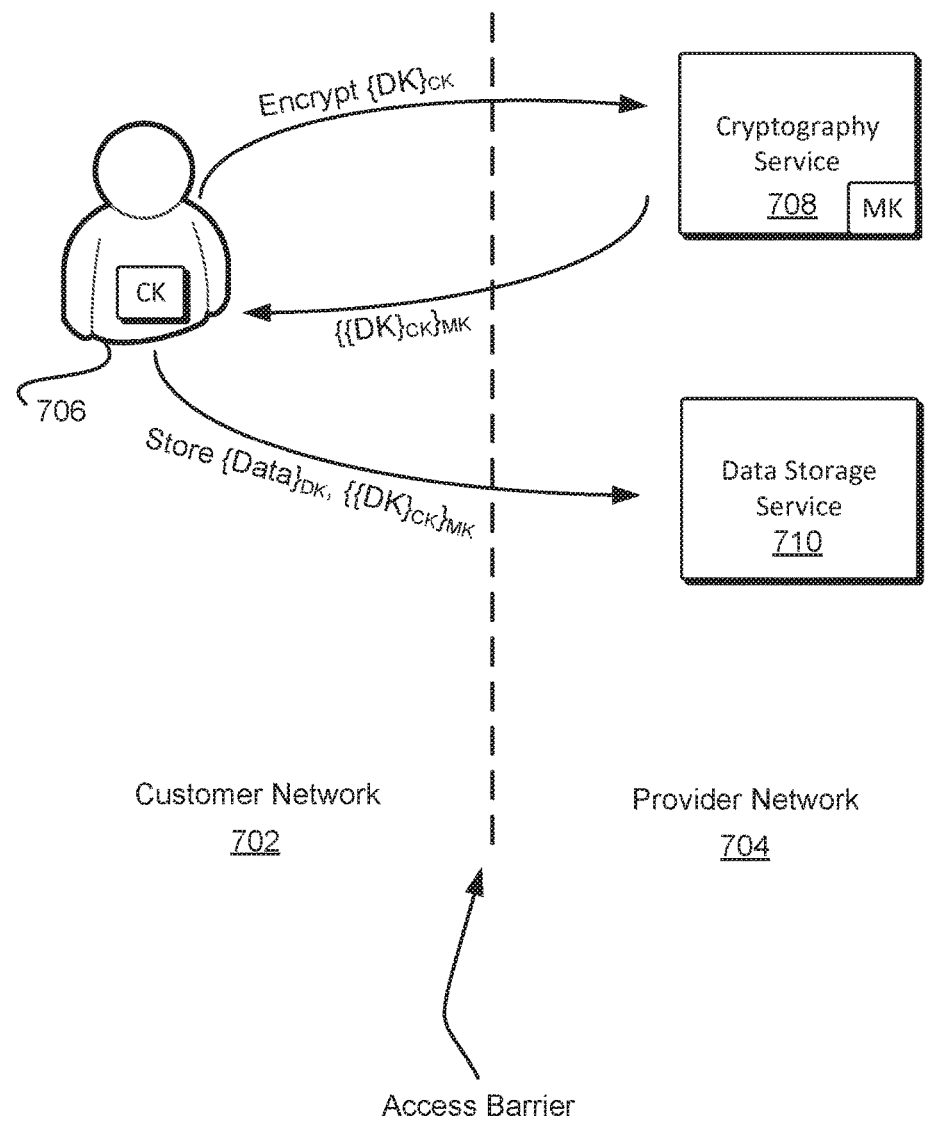
FIG. 7 shows an illustrative example of a manner of storing data securely in accordance with at least one embodiment.

FIG. 7 shows a diagram illustrating another embodiment of the present disclosure. As illustrated, the diagram shows an environment that includes a customer network 702 and a provider network 704 which may be networks such as described above and which may be separated by an access barrier such as described above. As illustrated in FIG. 7, a customer 706 has access to a customer key, abbreviated as CK. Unlike the embodiment illustrated above in connection with FIG. 5, in FIG. 7 the service provider operating the provider network 704 never has access to a data key, abbreviated as DK, used to encrypt data. In the embodiment illustrated in FIG. 7, the customer 706 has access to a data key, such as by generating the data key itself or receiving the data key from another entity, such as another service provider not illustrated.

In the illustrated embodiment, the customer 706 submits a request to a cryptography service 708 of the service provider operating the provider network 704. As above, the request may be an appropriately configured API call to encrypt the data key encrypted under the customer key. The customer, for example, may have used the customer key to encrypt the data key and provided the data key encrypted under the customer key to the cryptography service 708 in the request. The cryptography service 708 may respond to the request by encrypting the data key encrypted under the customer key using a managed key corresponding to the customer 706 such as described above. The response, therefore, may include the data key encrypted under both the customer key and the managed key, e.g., $\{\{DK\}_{CK}\}_{MK}$. The customer may then persist to the data encrypted under the data key and the data key encrypted under both the customer key and managed key. In this manner, both the customer key and managed key are necessary for accessing the data key in order to decrypt the data. The customer may, for example, cause the data encrypted under the data key and the data key encrypted under both the customer key and managed key to be stored using a data storage service of the service provider that operates the provider network 704 or in another location, such as described above.

Figure 8:
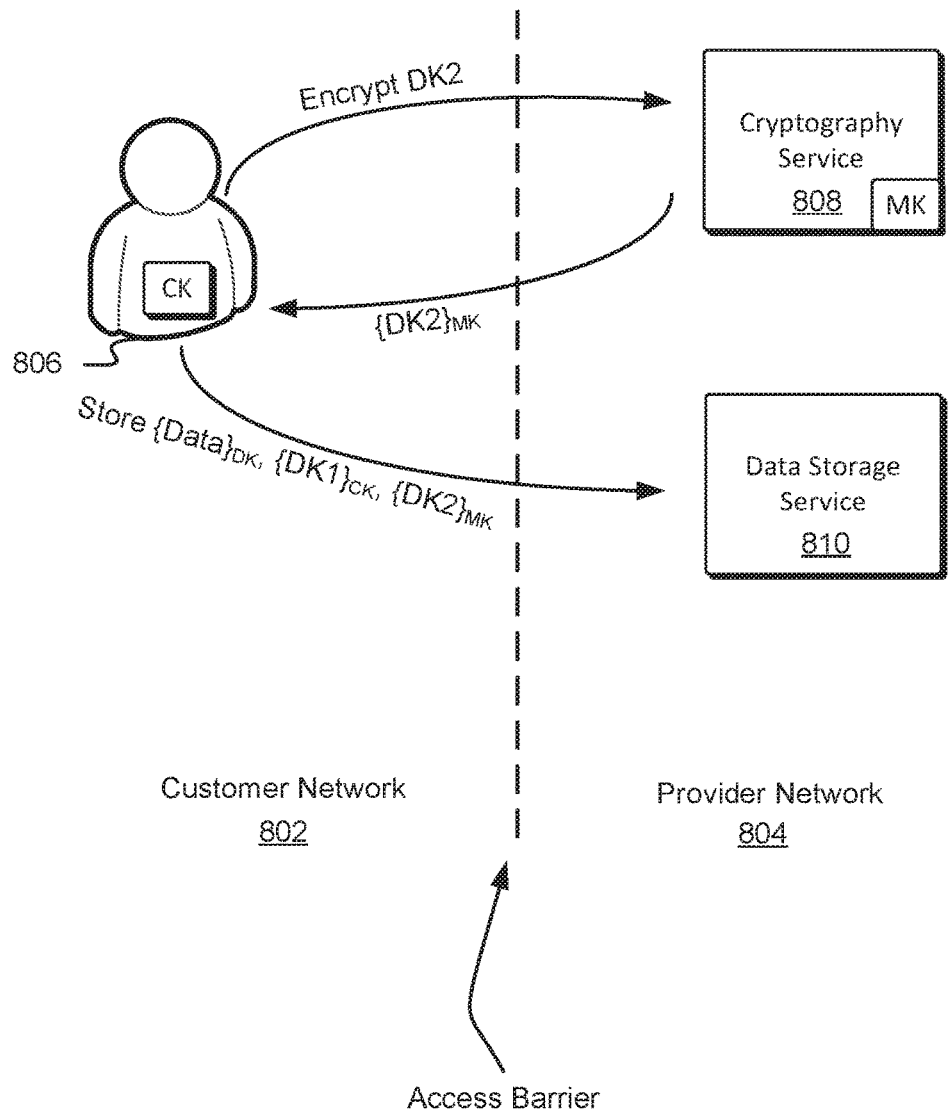
FIG. 8 shows an illustrative example of a manner of storing data securely in accordance with at least one embodiment.

In some embodiments, a data key is formed from components that are individually encrypted using different keys accessible by different entities in order to achieve similar results. FIG. 8 accordingly shows an illustrative example of an embodiment of the present disclosure. FIG. 8 in particular shows a diagram illustrating an environment that includes a customer network 802 and a provider network 804 such as described above. Similarly, the customer network 802 and provider network 804 may be separated by an access barrier such as described above. As illustrated in the figure, a data key abbreviated as DK, is formed from multiple components. In this example, components are abbreviated as DK1 and DK2, and a data key can generally be thought of as a function of DK1 and DK2. In some embodiments, for example, DK1 and DK2 concatenated together in a specified order to form the data key DK. However, any function that uses DK1 and DK2 as input may be used to generate DK. Also, it should be noted that DK1 and DK2 may be derived from DK or vice versa. For example, DK1 and DK2 may be obtained and then combined, or DK may be obtained and divided or otherwise processed to determine DK1 and DK2.

In the embodiment illustrated in FIG. 8, the customer has access to DK and a customer key, CK. Access to the data key may be achieved in any suitable manner, such as by obtaining the data key from a different entity such as described above, or by generating the data key itself. Also, as illustrated, the customer has access to the components of the data key, DK1 and DK2. In the illustrated embodiment, the customer submits a request to a cryptography service 808 of the provider network 804. As discussed above, the cryptography service 808 may have access to a managed key, abbreviated MK, which is managed on behalf of the customer 806. The cryptography service 808 may respond to the request to encrypt the second data key, DK2, where the response includes the second data key encrypted under the managed key, $\{DK2\}_{MK}$. The customer may encrypt the first component of the data key, DK1, using the customer key. The $\{Data\}_{DK}$, $\{DK1\}_{CK}$ and $\{DK2\}_{MK}$ may then be persisted, such as in a data storage service 810 operated by the service provider that operates the provider network, or in another way such as described above. For example, the customer 806 may, through one or more appropriately configured API calls, cause the data storage service 810 to store $\{Data\}_{DK}$, $\{DK1\}_{CK}$ and $\{DK2\}_{MK}$ in association with one another, in one or more data objects.

Figure 9:
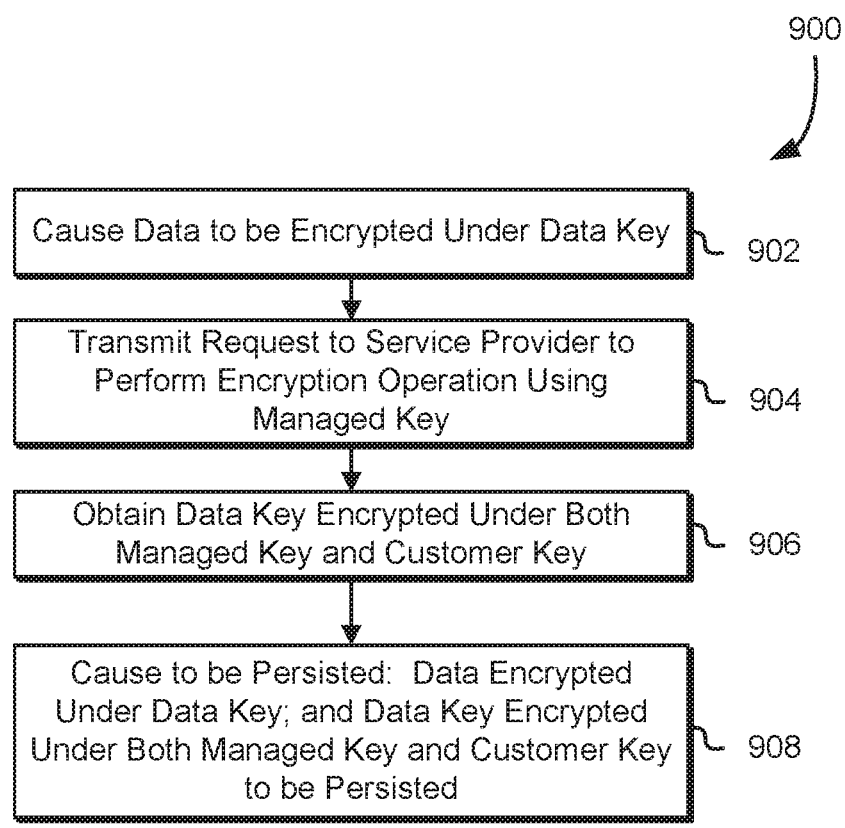
FIG. 9 shows an illustrative example of a process for storing data in accordance with at least one embodiment.

FIG. 9 shows an illustrative example of a process 900 that may be performed to securely store data in accordance with various embodiments. The process 900 may be performed by any suitable system, such as by a computer system of a customer configured with executable instructions for communicating with one or more service providers, such as described above. In an embodiment, the process 900 includes causing 902 data to be encrypted under a data key. The data key may be obtained by a system performing the process 900 in any suitable manner. For instance, referring to FIGS. 5-6, the data key may be obtained from a cryptography service. In other examples, a system performing the process 900 may generate the data key itself. Further, causing 902 the data to be encrypted under the data key may be performed in various ways in accordance with various embodiments. For example, a system performing the process 900 may encrypt the data using the data key itself. As another example, a system performing the process 900 may transmit the data to another system that has access to the data key to cause the other system to encrypt the data using the data key. Generally the data may be caused 902 to be encrypted using the data key in any suitable manner.

A request may be transmitted 904 to a service provider to perform an encryption operation using a managed key. The request may identify the managed key, which may be a key managed by a service provider on behalf of the system performing the process 900 or a customer associated therewith. The particular encryption operation to be performed may vary in accordance with various embodiments. For example, referring to FIG. 5, the encryption operation may include encrypting the data key using the manage key. Similarly, referring to FIG. 6, the encryption operation may include encrypting the data key using one of several managed keys used in accordance with performance of the process 900. Referring to FIG. 7, the encryption operation may include encryption of the data key already encrypted under another key, such as a customer key or another managed key. Referring to FIG. 8, the encryption operation may include decryption of a component of the data key using the managed key. While not illustrated in FIG. 9, the process 900 may also include additional requests to the same or another service provider, such as illustrated in FIG. 6.

In an embodiment, the process 900 also includes obtaining 906 the data key encrypted under both the managed key and the customer key (and possibly one or more other keys). Referring to FIG. 5, for example, obtaining 906 the data key encrypted under both the managed key and customer key may include receiving the data key encrypted under the managed key and using the customer key to encrypt the received data key encrypted under the managed key. Referring to FIG. 7, obtaining 906 the data key encrypted under both the managed key and the customer key may include encrypting the data key using a customer key and transmitting the data key encrypted under the customer key to a service provider to be encrypted additionally under a managed key (and obtaining a result of such encryption). Referring to FIG. 8, obtaining 906 the data key encrypted under both the managed key and the data key may include transmitting a portion of the data key, whether in plaintext or encrypted form, to a service provider for encryption using a managed key (and obtaining the result of such encryption).

In various embodiments, the process 900 includes causing 908 data to be persisted (i.e., persistently stored) such that multiple keys are needed to access the data. For example, as illustrated in FIG. 9, the process 900 may include persistently storing (e.g., causing another system to store): data encrypted under the data key; and data encrypted under both the managed key and the customer key, such as described above in connection with FIGS. 5-8.

Figure 10:
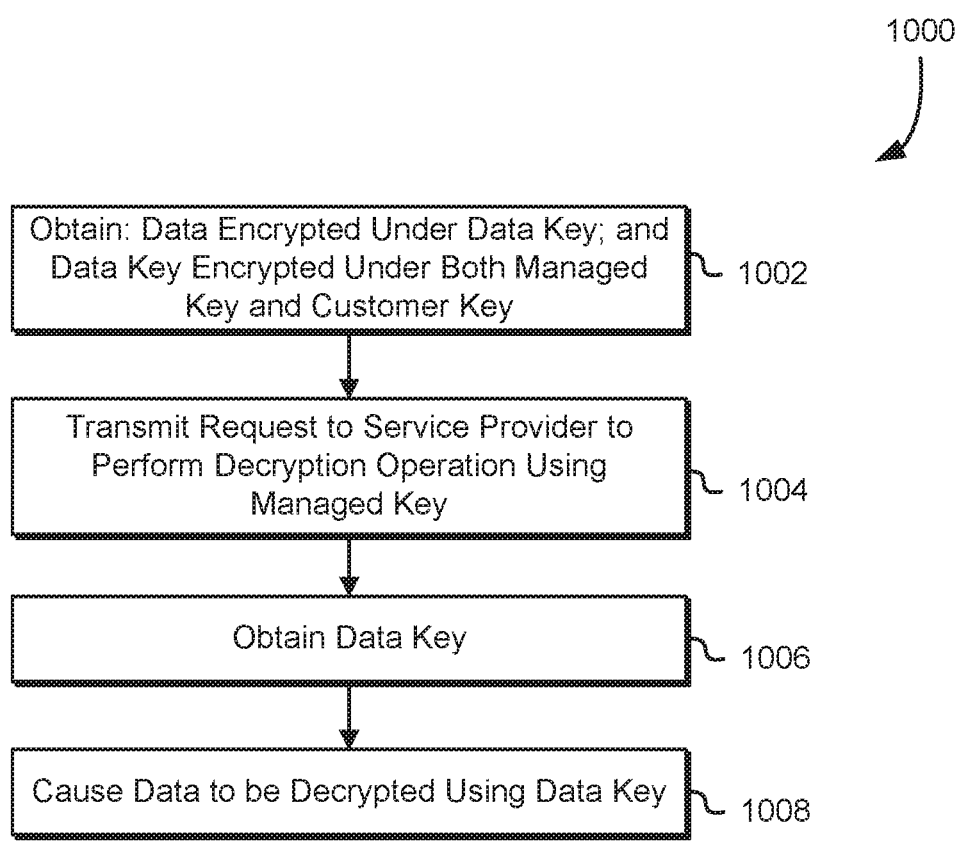
FIG. 10 shows an illustrative example of a process for accessing data in accordance with at least one embodiment.

As noted, various embodiments of the present disclosure allow for the secure storage of data encrypted in away to as to make the data accessible only with access to multiple keys. FIG. 10 shows an illustrative example of how to access data in accordance with the various embodiments described herein. As shown in FIG. 10, the process 1000 includes obtaining 1002 data encrypted under a data key as well as the data key encrypted under both a managed key and a customer key. The data key encrypted under both a managed key and a customer key may be persistently stored in accordance with the process 900 and/or other techniques described herein. In an embodiment, the process 1000 includes transmitting 1004 a request to a service provider to perform a decryption operation using the managed key. The decryption operation may vary in accordance with the various embodiments, for example referring to FIGS. 5-6 the decryption operation may include decryption of a data key encrypted under the managed key. The data key encrypted under the managed key may be obtained by decrypting the data key encrypted under the managed key encrypted under the customer key. Referring to FIG. 7, the decryption operation may be an operation to decrypt a data key encrypted under a customer key encrypted under a managed key. In other words, using the notation of FIGS. 5-8, the decryption operation may include decrypting $\{\{DK\}_{CK}\}_{MK}$ to obtain $\{\{DK\}_{CK}$. Referring to FIG. 8, the decryption operation may include using the managed key to decrypt a component of a data key. Generally, the result of the decryption operation may be used to obtain 1006 the data key. The process 1000 may include causing data to be decrypted using the data key that has been obtained, such as by an entity with access to the data key.

As with all processes described herein, variations are considered as being within the scope of the present disclosure. For example, while not illustrated in FIG. 10, the process 1000 may include additional operations, such as causing certain data to be decrypted by the same or another service provider. For example, if a process for encrypting data includes causing a second service provider to use a managed key to encrypt some or all of the data key, the second service provider or other entity with access to the managed key may be caused to perform an appropriate decryption operation. Generally, in embodiments where encryption includes operations additional to those described herein, access to the data may include appropriate decryption operations.

Numerous other variations are considered as being within the scope of the present disclosure. For example, as noted above, a customer computer system may perform various processes described herein in accordance with executable instructions encoded on a computer-readable storage medium. The instructions may be provided to the customer computer system from a service provider, such as part of a client library of executable code programming modules provided by the service provider. The service provider may make such code accessible over the Internet or another network. In addition, various embodiments are illustrated herein using two or three different entities with access to different keys, although the scope of the present disclosure is not limited to such embodiments and numbers of involved entities. For example, the techniques illustrated and described herein are extendible to involve additional entities with access to keys. Generally, data and/or keys may be wrapped (e.g., encrypted) using multiple keys from different entities. A customer computer system may be configured to orchestrate the actions (e.g., encryption/decryption) of the various entities for the purpose of encrypting data so that involvement of all entities is required and for the purpose of decrypting data encrypted in such a manner.

In some examples, one or more cryptographic operations (e.g., performed by a service provider) are performed using an encryption algorithm that supports the use of additional authenticated data (AAD). In an embodiment, the AAD is data that is used, with data to be encrypted, as an input into the encryption algorithm. The AAD may be persisted in plaintext form. The encryption algorithm may be configured such that, a corresponding decryption requires the ciphertext and unaltered AAD for decryption to be successful. Further, a system (e.g., service provider system) may use AAD to enforce policy. For instance, one or more values in the metadata (e.g., IP address, identity, logical data container identifier of logical data container used to store data, etc.) can be used to determine whether decryption is allowed by one or more policies that are based at least in part on the values. In this manner, both the cryptographic algorithm and policy serve to ensure that only authorized access to data is allowed. In other words, both the presence of unaltered AAD and policy allowing decryption are required before access to data is provided.

In addition, various techniques described above involve various communications with one or more service providers that can be orchestrated by a client computer system (e.g., computer, system of a customer, described above). Code for causing a client computer system to utilize one or more techniques may be integrated into a software development kit (SDK) used to create applications for the client computer system. Also, in some embodiments, a client computer system may be programmed to utilize one or more of the techniques described above in connection with various triggers. In one example, an application may provide a file system interface (e.g., a file system driver interface) or a storage device interface (e.g., for a virtual storage device that utilizes a data storage service). The various techniques described above may, as appropriate, be utilized in response to receipt of various commands through the interface. For instance, interaction with the interface indicating a command to store data in a file system or storage device may cause encryption to happen in accordance with one or more of the embodiments described above. Similarly, interaction with the interface indicating a command to retrieve data from the file system or storage device may cause utilization of one or more techniques described above for decrypting data. Such techniques may also be applied to other interfaces.

As another example of a variation considered being within the scope of the present disclosure. Integration of the various techniques described herein may be utilized in a manner that allows for backward compatibility. An application utilizing the various techniques may, for instance, read a configuration to determine how to interact with a service provider and which key's to use (i.e., which keys use itself and which keys to specify to the service provider). In this manner, if techniques encoded in an SDK change over time, data encrypted and stored using previously utilized techniques may nevertheless remain accessible. The SDK may contain programming logic that enables selection of which techniques to use (if any), which keys to use and the like. To determine which techniques to use (if any) and/or which keys to use, the programming logic in the SDK may utilize information about a local configuration set for the client computer system, information provided from a service provider computer system and/or in other ways.

Figure 11:
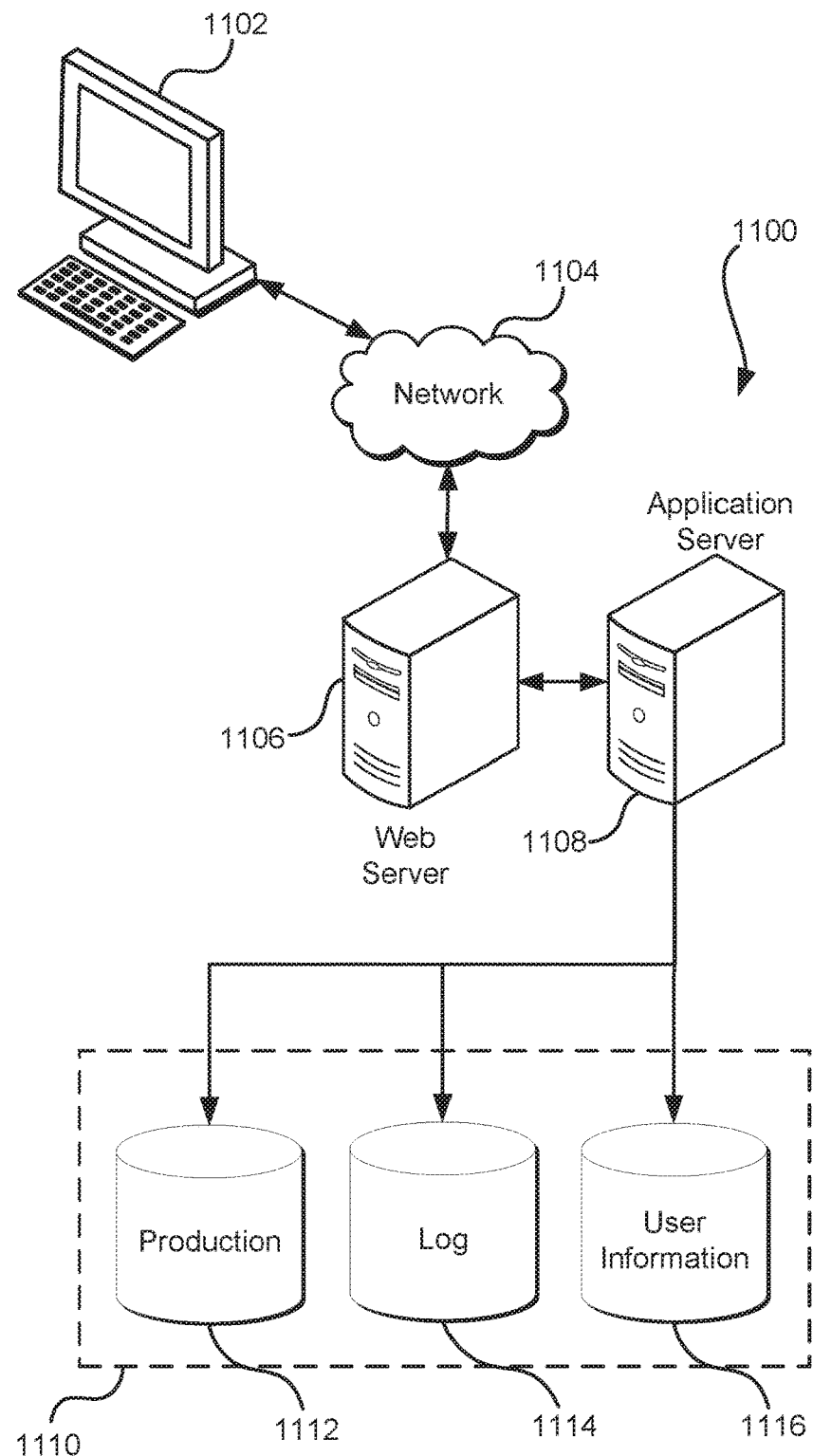
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio, and/or video to be transferred to the user, which may be served to the user by the web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1110 can include several separate data tables, databases or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response requests from user devices, such as by executing one or more web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or, portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. Ni should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening, Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:
1. A computer-implemented method, comprising:
under the control of one or more computer systems that execute instructions,
receiving, from a customer of a computing resource service provider, a request to perform one or more operations using a managed key that is inaccessible to the customer, the request including information that enables the computing resource service provider to select the managed key from other keys managed on behalf of customers of the computing resource service provider;

providing to the customer:
  a data key; and
  in addition to the data key, an encrypted data key;
receiving, from the customer, data encrypted under the data key; and
storing, in persistent storage, the encrypted data key and the data encrypted under the data key, wherein a customer key and the managed key that is inaccessible to the customer are collectively sufficient, but individually insufficient, to access the data in plaintext form from the persistent storage.

2. The computer-implemented method of claim 1, wherein:
the customer key is inaccessible to the one or more computer systems; and
the encrypted data key is encrypted at least in part under the managed key.

3. The computer-implemented method of claim 1, storing the encrypted data key and the data encrypted under the data key is performed as a result of receiving an instruction via a file system interface to perform a storage operation.

4. The computer-implemented method of claim 1, wherein:
the one or more operations include utilizing a cryptographic algorithm that supports additional authenticated data; and
the request includes metadata usable by the computing resource service provider as the additional authenticated data, wherein the computing resource service provider enforces one or more policies based at least in part on the metadata.

5. The computer-implemented method of claim 1, wherein storing the encrypted data key and the data encrypted under the data key includes transmitting, to a data storage service operated by the computing resource service provider, the encrypted data key and the data encrypted under the data key.

6. The computer-implemented method of claim 1, further comprising:
encrypting the data encrypted under the data key a second time to form doubly encrypted data, the data encrypted the second time under a second managed key;
providing, to the customer, the doubly encrypted data; and
storing the encrypted data key and the data encrypted under the data key includes storing the encrypted data key in association with the doubly encrypted data.

7. The computer-implemented method of claim 1, wherein:
the data key is based at least in part on a first data key component and a second data key component;
the request received from the customer includes the first data key component;
the encrypted data key is a first encrypted data key component; and
the method further comprises:
  encrypting the first data key component under the managed key to form the encrypted data key component;
  receiving, from the customer, a second encrypted data key component, the second encrypted data key component encrypted under the customer key; and
  storing, in persistent storage, the second encrypted data key component in association with the data encrypted under the data key.

8. A system, comprising:
a first service that includes one or more first processors and first memory including first instructions that, as a result of execution by the one or more first processors, cause the first service to:
  receive a first request, from a customer of a computing resource service provider, to perform one or more operations using first information that is inaccessible to the customer, the request including information that enables the computing resource service provider to select the first information from other keys managed on behalf of customers of the computing resource service provider;
  provide to the customer:
    a first cryptographic key; and
    in addition to the first cryptographic key, an encrypted first cryptographic key; and
a second service that includes one or more second processors and second memory including second instructions that, as a result of execution by the one or more second processors, cause the second service to:
  receive a second request, from the customer, to store data encrypted under the first cryptographic key; and
  store, in persistent storage, the encrypted first cryptographic key and the data encrypted under the first cryptographic key wherein second information and the first information that is inaccessible to the customer are individually insufficient for accessing the data in plaintext form from the persistent storage.

9. The system of claim 8, wherein:
the first request is received via a first application programming interface provided by the first service; and
the second request is received via a second application programming interface provided by the second service.

10. The system of claim 8, wherein:
the first cryptographic key is determinable from a plurality of key components that include:
  a first key component; and
  a second key component; and
the encrypted first cryptographic key includes:
  the first key component encrypted using the second information; and
  the second key component encrypted using the first information.

11. The system of claim 8, wherein the second information is:
accessible to the customer; and
inaccessible to the system.

12. The system of claim 8, wherein:
the first information includes a second cryptographic key; and
the second information includes a third cryptographic key.

13. The system of claim 8, wherein:
the first cryptographic key is based at least in part on a first key component and a second key component;
the first request includes the first key component;
the first instructions include instructions that cause the first service to encrypt the first key component using the first information to form a first encrypted key component;
the first instructions that cause the service to provide the encrypted first cryptographic key to the customer include instructions that cause the service to provide the first encrypted key component;
the second request includes the second key component encrypted using the second information to form a second encrypted key component; and the second instructions that cause the second service to store the encrypted first cryptographic key include instructions that cause the second service to store, in association with the data encrypted under the first cryptographic key, both the first encrypted key component and the second key component.

14. The system of claim 8, wherein:
a third service that includes one or more third processors and third memory including third instructions that, as a result of execution by the one or more third processors, cause the third service to:
receive a third request, from the customer, to perform one or more second operations on the data encrypted under the first cryptographic key;
encrypt the data encrypted under the first cryptographic key a second time to form doubly encrypted data, the data encrypted the second time using fourth information; and
provide to the customer, the doubly encrypted data; and
the second instructions that cause the second service to store the encrypted first cryptographic key and the data encrypted under the first cryptographic key include instructions that cause the second service to store the encrypted first cryptographic key in association with the doubly encrypted data.

15. The system of claim 14, wherein:
the first information includes a first managed key that is accessible to the first service and inaccessible to the second service; and
the fourth information includes a second managed key is accessible to the second service and inaccessible to the first service.

16. A non-transitory computer-readable storage medium having stored thereon executable instructions that, as a result of being executed by one or more processors of a computer system, cause the computer system to at least:
receive, from a customer of a computing resource service provider, a request to perform one or more operations using a second key that is inaccessible to the customer, the request including information that enables the computing resource service provider to select the second key from other keys managed on behalf of customers of the computing resource service provider;
provide to the customer:
a first key; and
in addition to the first key, an encrypted first key;
receive, from the customer, data encrypted under the first key; and
cause the encrypted first key and the data encrypted under the first key to be stored in persistent storage, wherein accessing the data in plaintext form from the persistent storage involves a collective use of both:
the second key that is inaccessible to the customer; and
a third key.

17. The non-transitory computer-readable storage medium of claim 16, wherein the executable instructions that cause the computer system to provide the encrypted first key include executable instructions that cause the computer system to encrypt the first key under the second key to form the encrypted first key.

18. The non-transitory computer-readable storage medium of claim 16, wherein the request is received through a web service interface of a service of the computing resource service provider.

19. The non-transitory computer-readable storage medium of claim 16, wherein the executable instructions that cause the encrypted first key and the data encrypted under the first key to be stored include executable instructions that cause a second computer system to store the encrypted first key and the data encrypted under the first key.

20. The non-transitory computer-readable storage medium of claim 16, wherein the third key is inaccessible to the computer system.

* * * * *